United States Patent [19]

Hafner

[11] 3,968,684

[45] July 13, 1976

[54] APPARATUS AND METHOD FOR DETERMINING OPTIMUM DIRECTION OF PROCESS OF SAILING VESSELS

[76] Inventor: Raoul Maria Johann Ottokar Karl Hafner, Clappers, Backwell Hill Road, Backwell, Bristol, England

[22] Filed: Jan. 6, 1975

[21] Appl. No.: 538,727

[30] Foreign Application Priority Data
Jan. 7, 1974    United Kingdom............... 676/74

[52] U.S. Cl............................. 73/178 R; 73/387; 235/150.26
[51] Int. Cl.².......................................... G01C 21/20
[58] Field of Search................ 73/187, 178 R, 180, 73/188, 189; 235/150.26

[56] References Cited
UNITED STATES PATENTS

| | | | |
|---|---|---|---|
| 3,804,057 | 4/1974 | Toscan................. | 73/180 |
| 3,814,910 | 6/1974 | Palmieri et al................ | 235/150.26 |
| 3,881,094 | 4/1975 | Taylor et al. ................. | 235/150.26 |
| 3,881,095 | 4/1975 | Taylor et al. ................. | 235/150.26 |

*Primary Examiner*—Donald O. Woodiel
*Attorney, Agent, or Firm*—Larson, Taylor and Hinds

[57] ABSTRACT

Apparatus and a method for use in determining the optimum direction of progress of a sailing vessel from one point to a second point are described. The angle of leeway between the direction of heading of the vessel and the course of the vessel is measured and the course of the vessel is set to a required apparent wind direction so as to obtain the sum of the angle, leeway and the angle of the apparent wind direction with respect to the direction of heading. The distance covered by the vessel relative to the apparent wind in a given space of time is measured. Simultaneously the distance covered by the vessel relative to the water in said space of time is measured. The quotient of the measured water distance divided by the measured air distance is obtained, and a chart relating the said sum and the said quotient is used to give a figure of merit for the course. Three separate charts for use respectively in "reaching," "beating" and "running" are provided. For setting the required apparent wind, a masthead wind direction discriminator is provided. This comprises a wind vane to be set by the helmsman to a desired apparent wind direction. The vane can oscillate through a limited angle and its movements are integrated electrically and fed to an indicator that enables the helmsman to steer to the required course. Rotors are arranged to deliver signal impulses representing the water speed and the wind speed with respect to the vessel and these signal impulses are delivered to a counting instrument that operates over a predetermined period of time to register the aforesaid quotient.

13 Claims, 18 Drawing Figures

APPARATUS AND METHOD FOR DETERMINING OPTIMUM DIRECTION OF PROCESS OF SAILING VESSELS

FIELD OF THE INVENTION

This invention relates to apparatus and a method for obtaining an optimum performance from varying parameters and more specifically, though not exclusively, to a method of obtaining an optimum performance from a sailing vessel measuring the performance of the sailing vessel when under way.

In sailing a vessel from one point to another whether reaching, beating or running the basic object is to cover a minimum distance in a minimum time and it is therefore an object of this invention to provide a method whereby this minimum distance and time may be achieved.

SUMMARY OF THE INVENTION

According to the invention apparatus is provided for determining the optimum direction of progress from one point to a second point, said apparatus, comprising variable parameter measuring means, indicator means for determining the optimum positioning of said variable parameter measuring means, mean value recording means and readout means to which said mean values are applied to determine said optimum direction of progress.

According to a further aspect of the invention an integrating means is provided for indicating true integration with respect to time of a vane displacement from a central position.

DESCRIPTION OF THE DRAWINGS

A description of the requirements as applied to sailing and embodiments of the invention will now be described, by way of example only, in conjunction with the accompanying drawings, in which.

DESCRIPTION OF THE PRIOR ART

Figures 1, 2:
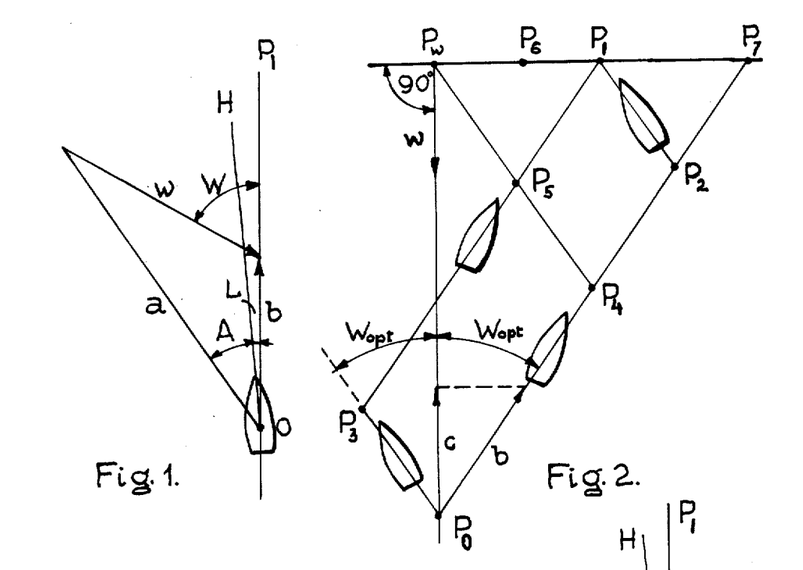
FIG. 1 is a vector diagram showing a mode of progress known as reaching.
FIG. 2 is a vector diagram showing a mode of progress known as beating.

The performance of a sailing vessel is established generally by comparing the speed of the vessel with the speed of the wind that drives it. A useful concept here is the sailing figure of merit, which is this speed ratio. However, as there are basically three distinct modes of sailing, the figure of merit is computed in three distinct ways to suit the different modes of sailing. This will be explained in the following:

Possibly the simplest mode of sailing is "reaching" as shown in FIG. 1 and here the direction of the wind is such that permits a straight course to be steered from the starting point O to the point of the destination $P_1$ the course steered here is $O-P_1$ and the speed of the boat is $b$ along this course. The direction and the speed of the true wind is given by the speed vector $w$. The angle between this vector and the course is the angle of the true wind W. However, due to the speed of the boat the apparent wind differs in direction and magnitude from the true wind. It is shown by the vector $a$. Because of the force of the wind, a sailing boat is always set leewards slightly so that there is a small angle between the direction of heading O-H and the course $O-P_1$ this angle is called the leeway L. The apparent direction of the wind is the angle A between $a$ and the heading of the boat O-H. The sailing figure of merit in this mode of sailing is $\epsilon 1 = b/w$ because in a given set of wind $w$ and course $O-P_1$ the boat with the highest $b$ will achieve the highest $\epsilon_1$ and also arrive quickest at the destination $P_1$.

It can be shown that:

$$\Sigma_1 = \frac{b}{w} = \frac{K}{\sqrt{1 + K^2 - 2K \cos A_t}}$$

where $K = b/a$ and $A_t = A + L$

Figure 3:
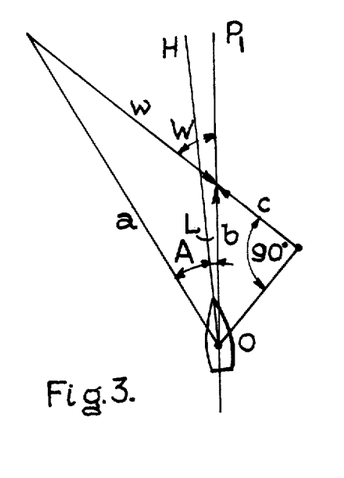
FIG. 3 is a vector diagram showing speed vectors that arise when "sailing by the wind"

A second method is known as beating as shown in FIG. 2 and is used because a sailing vessel cannot be set on a course directly into the wind. There is a minimum angle $W_{opt}$ which the course must make with the direction of the true wind and if the vessel is pointed higher into the wind it will lose speed rapidly. This is called pinching. If, therefore, the angle between the required course $P_0 - P_1$ and the direction of the true wind shown by the arrowhead pointing from $P_w - P_0$ is less than the angle $W_{opt}$ then the point of destination $P_1$ cannot be reached on a straight course, but in two or more legs which are courses on either side of the direction of the true wind by the angle $W_{opt}$. Because these two courses are related to the direction of the true wind, the term "sailing by the wind" is sometimes used. Whilst the direction of the legs are fixed by the wind their lengths are made to meet the point $P_1$. It will be seen from the figure that in sailing by the wind, the passage from $P_0 - P_1$ can be made in many ways i.e. $P_0 - P_2 - P_1$ or $P_0 - P_3 - P_1$ or $P_0 - P_4 - P_5 - P_1$. It will also be noted that because of the properties of the parallelogram, the distance in all cases is the same so that the vessel will take the same time to reach $P_1$ whatever the way chosen. There is a further important point. If a line is drawn in the direction of the true wind going through $P_0$ and a second line at rightangles to the wind going through $P_1$ and the two lines intersect at $P_w$. This point may be termed the "windward point" of $P_1$ because, being a projection of $P_1$ on to the line $P_0 - P_w$ it lies directly windward of $P_0$. It will be noted that the distance $P_5 - P_w$ is equal to the distance $P_5 - P_1$ thus, in sailing "by the wind" one will reach the windward point $P_w$ at the same time as $P_1$. Indeed, this holds true for any point of destination ($P_6$ or $P_7$) that lies on a line at right angles to the wind. This windward point is, therefore, the key point for making a passage from $P_0 - P_1$ when sailing by the wind. Thus the aim is to reach $P_w$ as quickly as possible which means that not the speed $b$ of the boat, but its effective component $c$ in the direction $P_0 - P_w$ or the speed "made good into wind" is the one that matters in this mode of sailing and the relevant figure of merit here is therefore $\epsilon 2 = c/w$. FIG. 3 shows the speed vector triangle in sailing "by the wind". It is like FIG. 1 but shows in addition the windward component $c$ of the boat's speed $b$. It will be noted that as the angle $W_{opt}$ increases, $c$ decreases rapidly, so that $\epsilon 2$ is very sensitive to changes in this angle.

It can be shown that:

$$\Sigma_2 = \frac{c}{w} = \frac{K(\cos A_L - K)}{1 + K^2 - 2K \cos A_L}$$

The third mode of sailing is termed "running" which conventionally has a wider connotation but in this context is confined to a form of zig-zag sailing like beating, but with a tail wind instead of a head wind. Whilst all sailing boats can run dead before the wind, the performance is generally poor for aerodynamic reasons, (especially without a spinnaker) and the boat will reach a downwind destination quicker on a zig-zag course (with gybing) than on the direct course, even though the distance is longer. All the arguments used previously apply here, with the main difference that the critical angle A is now the optimum downwind angle measured from the ship's course. The typical speed vector triangle in this mode of sailing is given in FIG. 4. The figure of merit for this mode of sailing is as before $\epsilon 3 = c/w$. As in this case the angle A is generally more than 140°, $c$ is not very sensitive to changes in this angle but mainly to the boat speed $b$.

Figure 4:
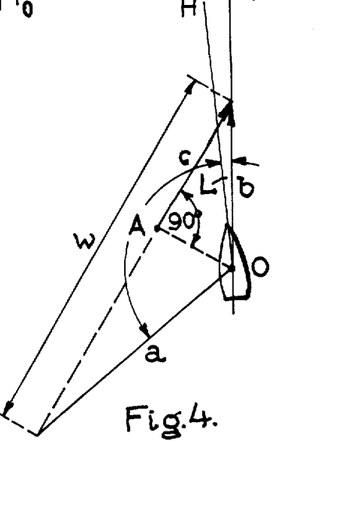
FIG. 4 is a vector diagram showing a mode of progress known as running.

It can be shown that:

$$\Sigma_3 = \frac{c}{w} = \frac{K(K - \cos A_L)}{1 + K^2 - 2K \cos A_L}$$

The parameters that can be measured by instruments on a boat during passage are the speed of the boat $b$, the apparent wind speed $a$, the apparent wind direction A and the leeway L. From these the figure of merit is computed which involves the use of the above Trigonometric functions which is elaborate and time consuming and cannot readily be done on board ship without special aids. So far mainly the following two techniques have been used.

1. A number of runs are made in which the parameters are systematically varied and the various instrument readings are recorded. From these the performance is then evaluated ashore. This technique is sometimes used by boat builders to establish the performance of new boats. It is cumbersome, the results being available only after the sailing tests and, therefore, of little interest to the practising sailor.
2. Instrument readings are fed into a computer which is carried on board and which evaluates the performance instantaneously. The main drawback here is the considerable cost of the installation if the computer is adequately programmed to perform the complete and correct computation. Even then the results suffer from the fact that inputs to the computer are instantaneous readings from speed and angle recording instruments which are subject to substantial fluctuation from one second to the next.

DESCRIPTION OF EXAMPLES OF THE INVENTION

The present invention presents a basically different approach to the problem to overcome substantially the above shortcomings; it is outlined below.

Figure 5A:
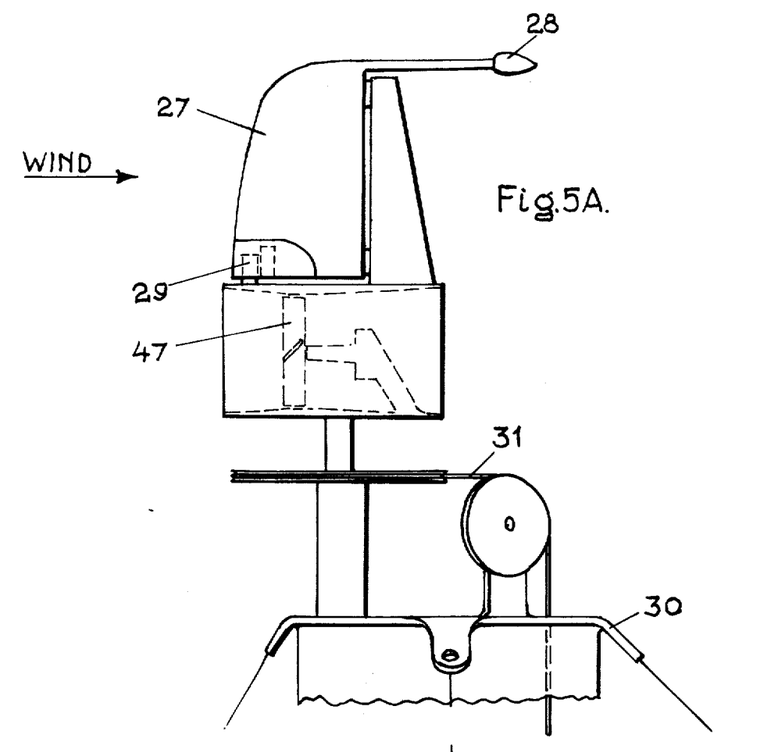
FIGS. 5A and 5B are respectively an elevation and a plan of a masthead installation for determining apparent wind speed and direction.
Figure 5B:
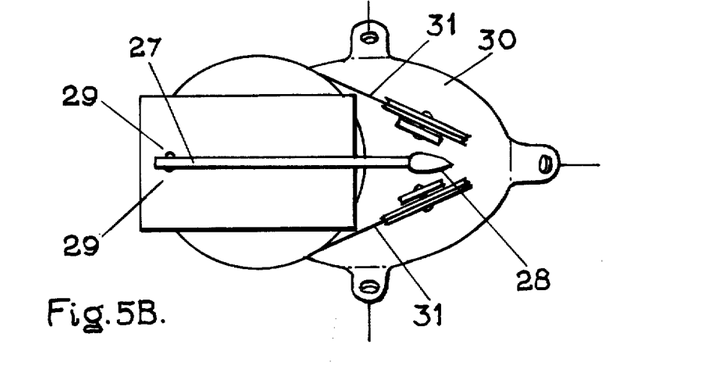

The apparent wind speed $a$ and boat speed $b$ are obtained by measuring the distance covered by the air and the water relative to the boat in a given space of time. This is preferably done by a freely spinning rotor (FIGS. 5A and 5B) at the masthead and a freely spinning rotor in the water (FIGS. 11A and 11B), producing electric impulses which are counted over a given time and thereafter read out digitally. The time base is chosen sufficiently long to ensure a reliable mean value of speed.

Figure 8:
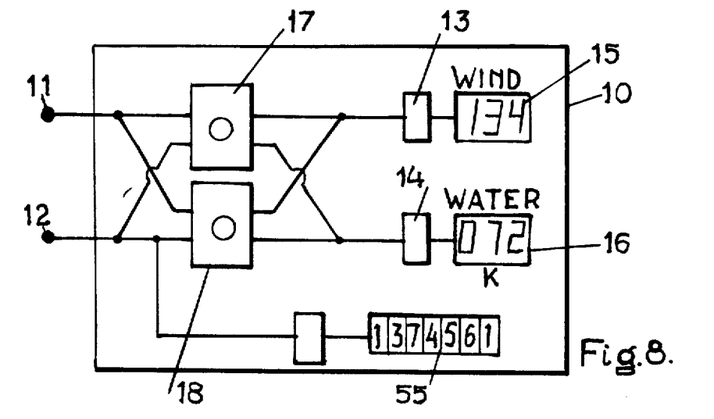
FIG. 8 is a block diagram of a counting unit.

FIg. 8 shows schematically a counting instrument 10 for mean speeds in accordance with the invention. Signal inputs 11 and 12 respectively are from the wind and water rotors. The instrument contains electronic elements and circuits 13 and 14 for counting the signal impulses as well as digital displays 15 and 16 giving the counts for wind and water respectively. There is also a switch and a timer 17 which provide for the counting of wind and water signals to start at the instant when the switch is pressed and to stop at an instant predetermined by the timer. The time lag may be varied to suit conditions e.g. to indicate speeds in knots or feet per second.

There is also a unit 18 comprising a switch and electronic elements and circuits which provide for the counting of wind and water signals to start at the instant when the switch is pressed and to stop at the instant when the counter for wind reaches the figure of 1000.

Figures 11A, 11B:
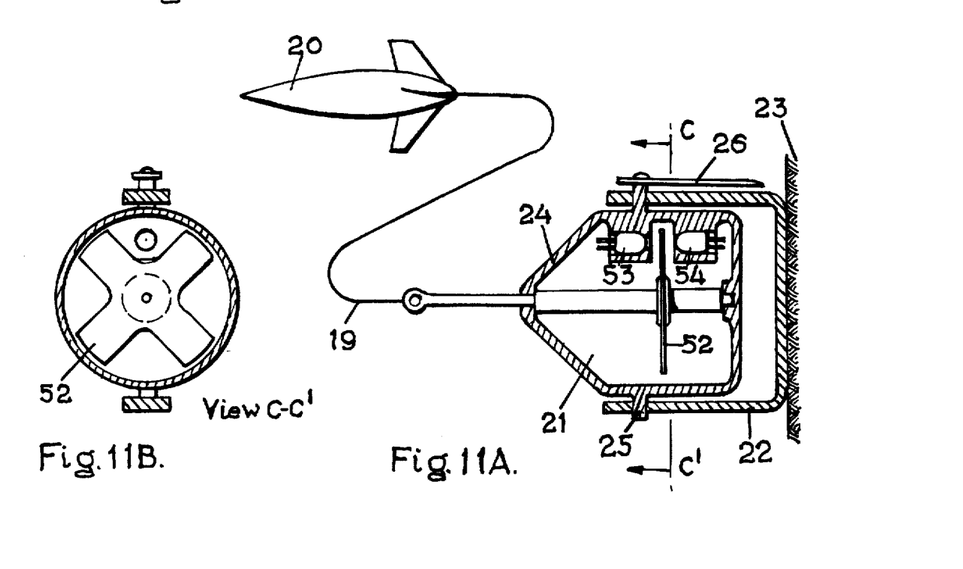
FIG. 11A is a sectional elevation of a water rotor and an electronic pick-up for this rotor.
FIG. 11B is a cross-section on line C–C' in FIG. 11A.

The leeway L is measured from the angle between a line 19 trailed in the water (for instance the trailing rotor 20 in FIG. 11A) and the fore and aft line of the boat. As the leeway is quite small, errors in the reading of this angle are not serious. As shown in FIG. 11A a unit 21 comprises a housing bracket 22 secured to the boat structure 23. A pick-up unit 24 is mounted on a vertical axle 25 enabling unit 24 to swivel about a vertical axis. A pointer 26 indicates the movement i.e. leeway L.

The angle A of the apparent wind requires special consideration. Ordinary wind vanes are very misleading. In the first place the apparent wind direction is subject to rapid changes due to gusts, the horizontal movement of the masthead due to rolling and pitching of the boat and finally the changes from the yawing of the boat due to the seas and the helmsman's errors. There are moreover the effects from the inertia of the vane so that it is difficult to ascertain in this way the mean angle of the apparent wind. In accordance with the present invention this mean angle is obtained by a wind direction discriminator at the masthead. In one form (FIGS. 5A and 5B) this comprises a wind vane 27, mass balanced by mass balance weight 28, about the vertical axis of rotation, but with the vane towards the wind. Two stops, 29 permit only a small movement of the vane (a few thousandths of an inch). The stops 29 are also electric contacts closing an electric D.C. circuit including a small electric motor (not shown) so that when contact is made on one side the motor runs in one direction and vice versa. The motor is mounted at the back of a display instrument, (not shown) and connected via a gear train to a pointer running over a dial (not shown) clockwise or counter-clockwise depending on the electric contacts made by the wind vane. As the motor runs at a constant speed, the displacement of the pointer from a given position will be proportional to the time spent on a given contact. Thus the instrument is integrating the time spent on the two contacts 29. If the aggregate time spent on the two contacts is equal, the displacement of the pointer will be nil. If more time is spent on one side than on the other, the pointer will be displaced accordingly. In a fluctuating wind direction the mean is the position where the time on one side of the mean is about the same as that on the other. The procedure in maintaining an accurate mean angle of apparent wind is thus as follows. The wind vane, 27 on the masthead, generally shown at 30, is set from the cockpit to a desired angle, which may be done very accurately by suitable means such as cable controls, 31 and the pointer of the display instrument is then observed. At first, because the boat is not on the right course that aligns the vane with the desired angle of apparent wind, the pointer will rotate steadily in one or the other sense. The boat must then be steered until this angle is reached. The steady rotation of the pointer will then cease and will be replaced by an oscillatory movement because of the fluctuation in the wind direction about the mean. The correct course of the boat is then obtained when the net displacement of the pointer over a length of time is substantially nil.

Figure 9A:
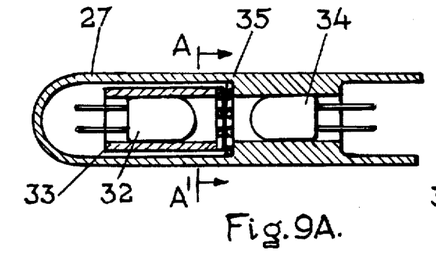
FIG. 9A is a sectional elevation of an electronic "pick-up" for a wind vane.
Figure 9B:
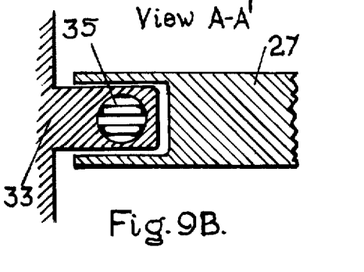
FIG. 9B is a cross-section on line A–A' in FIG. 9A.

In another form as shown in FIGS. 9A and 9B the signals from the wind vane 27 are obtained from a light emitting diode 32 which is fixed to the base 33 and a photo-cell 34 facing it which is fixed to the vane 27 both carrying light screens 35 in the form of black and transparent vertical lanes such that when the vane is against one stop, light passes through the two screens from the light emitting diode to the photo-cell which thus causes an electric currents to pass, but when the vane is against the other stop no light reaches the photo-cell thus producing a different signal current.

The wind direction discriminator in another form comprises a conventional mass balanced wind vane (not shown) which is limited in its movement by stops to a range of about 15° on either side of a central position. A trailing wind vane, 36, is connected to a low drag potentiometer 37 (FIG. 6), which over a Wheatstone bridge circuit 38, operates an indicating device 39. It will be seen from this figure that when the vane is in the central position as shown the electrical resistances in the Wheatstone bridge are symmetrical and consequently there is no current through the indicating instrument. If, however, the vane is displaced from the central position, the indicating instrument is subjected to a current in one direction or the other, depending on the displacement of the vane.

Figure 6:
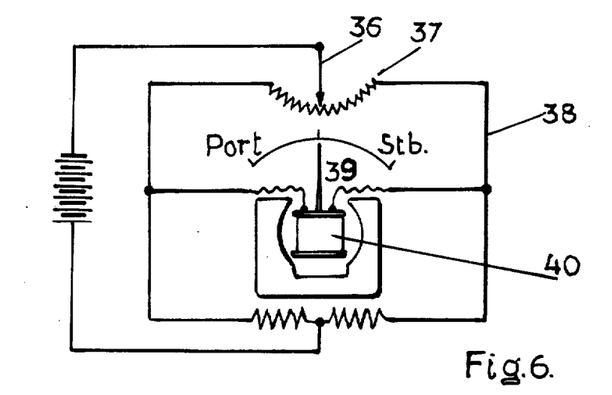
FIG. 6 is a circuit diagram of apparatus for indicating integrated displacement from mean apparent wind direction.

The indicating instrument 40 is designed like a moving coil voltmeter, however, without a spring restraining the movement of the needle. Instead of the spring restraint there is provided a substantial damping means (for instance by a disc moving in a magnetic field), so that there is only restraint to velocity of movement, but not to displacement. The instrument therefore functions within the range of movements of the pointer of about 120°, as an integrating device showing the true integration of the vane displacement from the central position.

Figure 7:
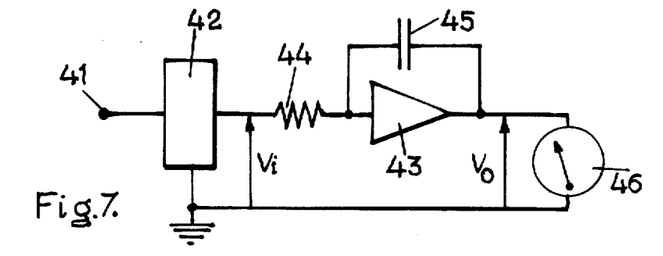
FIG. 7 is a circuit diagram of another apparatus for indicating integrated displacement from mean apparent wind direction.

This integration of vane displacement with respect to time can also be obtained in another form (FIG. 7). In this case an electric signals input 41 from a photocell in the wind vane (such as already described with) reference to FIGS. 9A and 9B) are transformed through an electronic unit 42 such that a potential difference ($V_i$) is produced at the input point when the vane is against one stop and the same difference, but of opposite sign when the vane is against the other stop. This voltage is then integrated with respect to time by using an operational amplifier 43, a resistor 44 and a capcitor 45 connected as shown in FIG. 7. The voltage at the output point is then equal to $V_o$ which is proportional to $\int V_i.dt$, and is indicated by a volt meter 46.

Figure 10A:
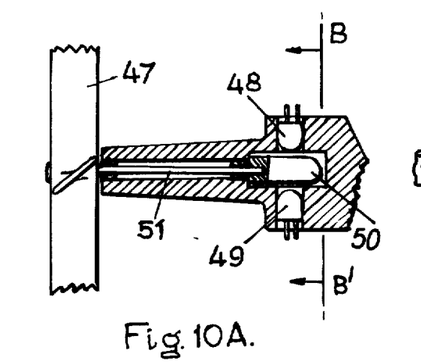
FIG. 10A is a sectional elevation of an electronic pick-up for a wind vane.
Figure 10B:
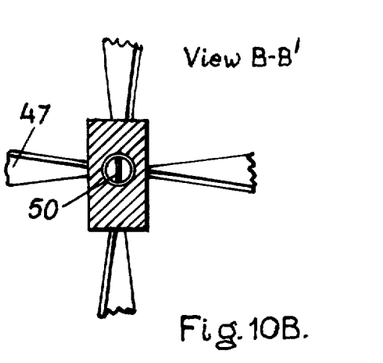
FIG. 10B is a cross-section on line B–B' in FIG. 10A.

FIGS. 10A and 10B show how electric signals can be obtained from the rotations of a wind rotor 47 (see also FIG. 5) through a light emitting diode 48 and, facing it, a photo cell 49. Between these elements is placed a flat screen 50 carried on the axle 51 of the wind rotor 47. When the plane of the screen is in line with these elements light can pass from the diode to the photo cell causing a signal current, but when the plane of the screen is at right angles to this position no light can pass, which produces a different current. A similar arrangement is shown in FIGS. 11A and 11B for the water rotor 20. Here the signal currents are produced by a star shaped screen 52 rotating in a plane between the light emitting diode 53 and the photo cell 54.

Figure 12:
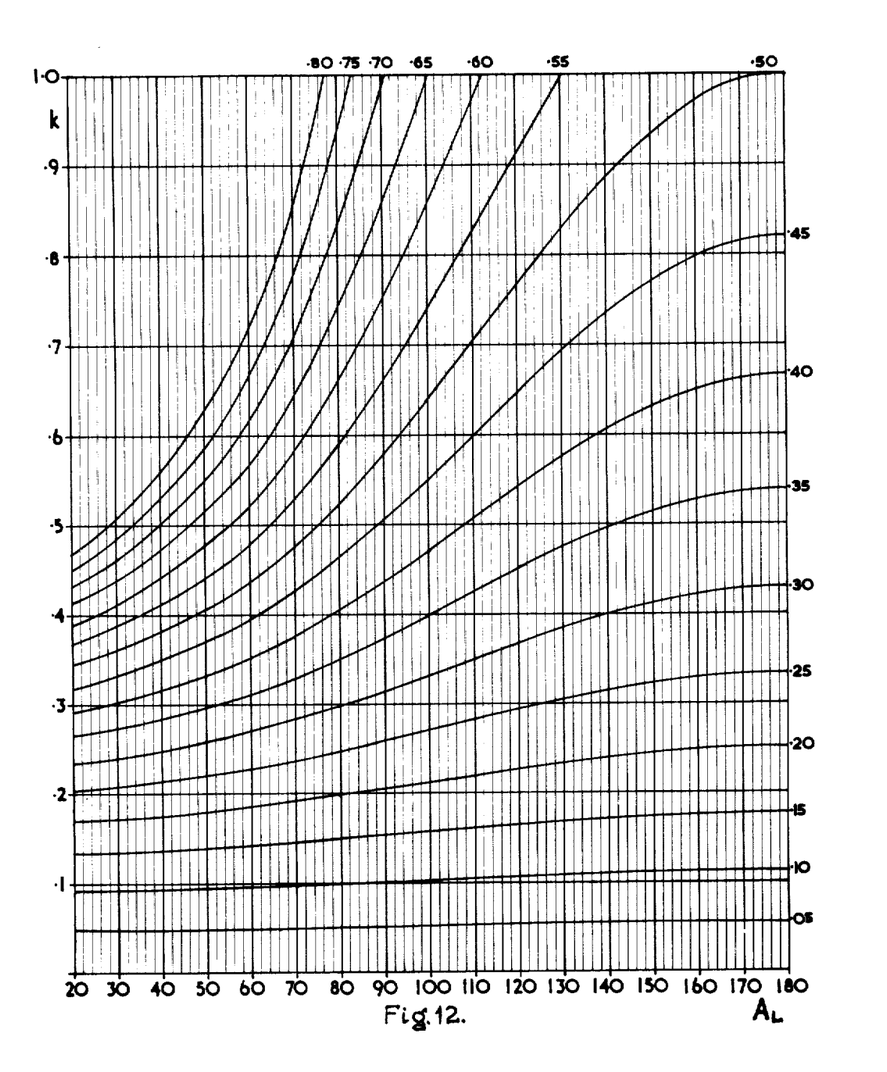
FIG. 12 is a graph relating to a function $\epsilon 1$.
Figure 13:
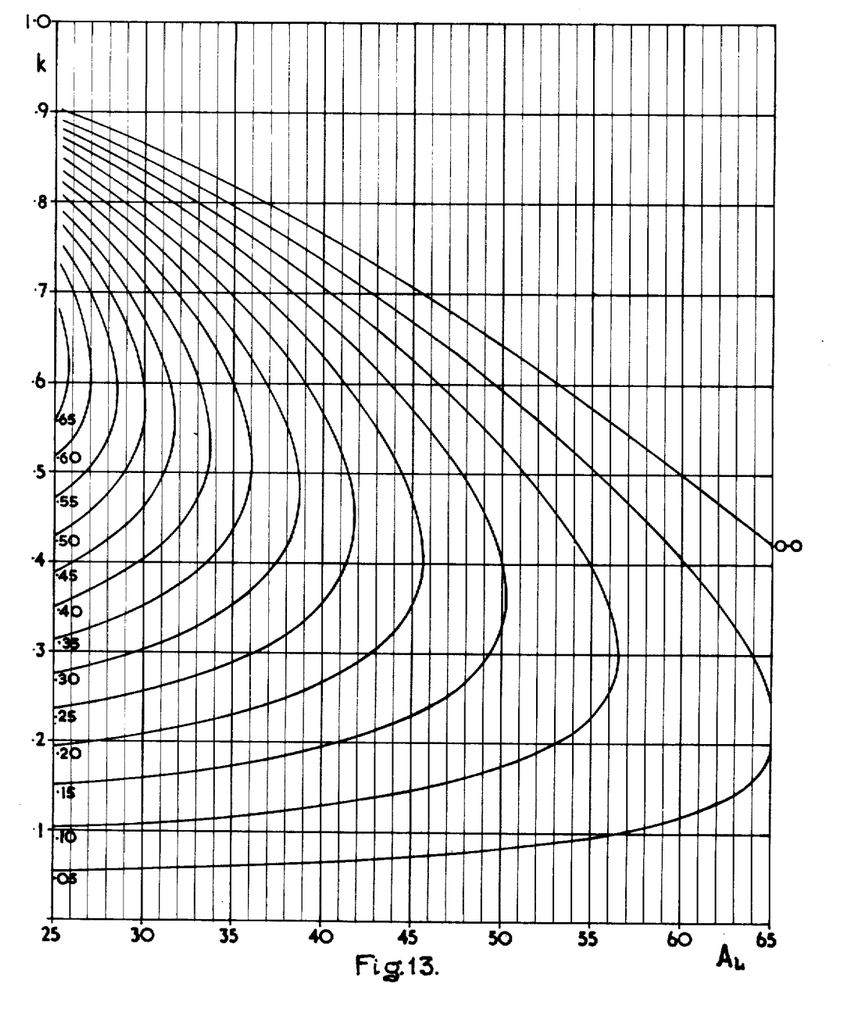
FIG. 13 is a graph relating to a function $\epsilon 2$.
Figure 14:
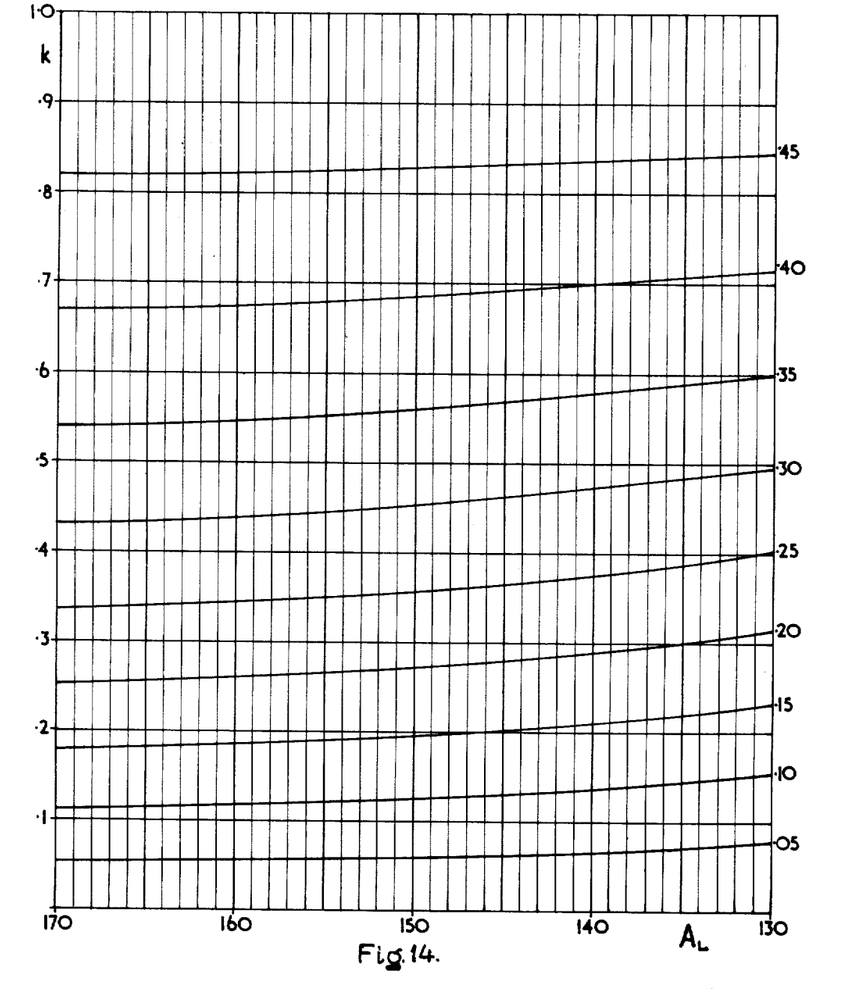
FIG. 14 is a graph relating to a function $\epsilon 3$.

The central position of the wind vane in relation to the wind is set, in all examples by rotating the vane unit at the masthead by a suitable control 31 to the angle required. Having achieved reliable mean readings for speeds and angles, the figures of merit are obtained by the above computations using these mean readings. These fingers of merit are obtained in three stages as follows:

1. The angle of leeway L which is a small angle of the order of 4° is added to the angle of apparent wind A set by suitable control, to give the angle $A_L$.
2. The parameter K is obtained by dividing the boat's speed by the speed of apparent wind. This operation is performed automatically in the speed-recording instrument simply by running both counting circuits simultaneously until the wind indicator (denominator) arrives at a round figure such as 1000, when they are both stopped automatically. The water indicator gives then the quotient which is the value of K (1000K).
3. The figures of merit for the three modes of sailing have been obtained by computation accurate to four digits and are displayed with precision in charts (FIGS. 12, 13 and 14) as a function of $A_L$ and K. The procedure is thus quite simple i.e. read the angle of apparent wind and add mentally the leeway L to give $A_L$. Then press the appropriate button on the counting instrument and wait until the figure for K is displayed. With $A_L$ and K enter the appropriate chart and read directly the value for $\epsilon$. The accuracy of the result obtained by this method is thus mainly dependent on the accuracy of reading the charts which with a little practice can be very good.

By recording regularly as points on the charts the sailing performance in various states of sea and wind, a graphic record of the overall performance of the vessel is obtained which is a valuable guide in subsequent operations.

I claim:

1. A method for use in determining a figure of merit regarding the course of a vessel in sailing from one point to a second point, comprising setting a wind vane, having a mean position between two limiting positions, relatively to the vessel with said mean position at a required angle of apparent wind with respect to the vessel, integrating of deviations of the wind vane from said mean position while steering the vessel to maintain said integration substantially at a zero value, measuring the angle of leeway between the direction of heading of the vessel and the course of the vessel, obtaining the sum of said required angle of apparent wind and said angle of leeway, using means providing a digital display to measure the distance covered by the vessel relative to the water in a given space of time, simultaneously measuring the distance covered by the vessel relative to air in said space of time, obtaining the quotient of said firstmentioned distance divided by said second-mentioned distance, selecting an appropriate one of three charts allocated respectively to beating, reaching and running modes of sailing, each said chart presenting a series of curves allocated to different figures of merit and having co-ordinates representing (a) the sum of the required angle of apparent wind and the angle of leeway and (b) the quotient of the first-mentioned distance divided by the second-mentioned distance and deriving a figure of merit from said chart based on the obtained sum and the obtained quotient.

2. Apparatus for use, in conjunction with a chart, in determining a figure of merit with regard to the course of a vessel, propelled at least to a substantial extent by the action of wind on the vessel, from one point to a second point, said chart means enabling such a figure of merit for said course to be obtained and comprising one co-ordinate representing the sum of (a) the angle of leeway between the direction of heading of the vessel and the course of the vessel and (b) the required apparent wind direction with respect to the vessel and a second co-ordinate representing the quotient of the distance covered by the vessel relative to the water within a predetermined period of time and the distance covered by the vessel relative to the air within the same period of time, said apparatus comprising means for measuring the angle of leeway between the direction of heading of the vessel and the course of the vessel, wind sensing means, adapted to be set to a mean position relatively to the vessel corresponding to a required apparent wind direction with respect to the vessel, indicating means controlled by said wind sensing means for indicating deviations of the apparent wind direction from said required direction so as to permit the vessel to be steered so that said mean position substantially represents the mean value of the apparent wind direction, means for measuring the distance covered by the vessel relative to the water in a given period of time, means for simultaneously measuring the distance covered by the vessel relative to the air in said period of time, and control means for said water and air distance measuring means for determining said given space of time and for providing the quotient of the measured water distance divided by the measured air distance.

3. Apparatus according to claim 2, wherein said wind sensing means comprises a wind vane arranged to be set by a helmsman at an angle relative to a vessel which is the desired apparent wind direction, said vane being mounted to oscillate through a limited angle on each side of said set angle, and said indicating means comprises means for integrating the oscillations of said vane within said limited angle and for producing output signals representing the integrated value of the oscillations of said vane, and an indicator responsive to said output signals enabling the helmsman to steer the vessel to a course in which said indicator shows equal fluctuations of said vane on opposite sides of said set angle.

4. Apparatus according to claim 3, in which said integrating means comprises a reversible electric motor, electric contact means at the limits of said limited angle and electric contact means on said vane connected in an electrical circuit, whereby said motor rotates in one direction when said vane reaches one of said limits and in the opposite direction when said vane reaches the other of said limits, said indicator being geared to said motor.

5. Apparatus according to claim 3, comprising a photo-cell and a light emitting diode mounted for relative movement corresponding to the movement of said vane within said limited angle, obturating means interposed between said cell and said diode adapted to pass light from said diode to said cell when said vane reaches one side of its limited angle of movement and to cut off light to said cell when said vane reaches the other side of said limited angle, circuit means comprising said cell and an electronic integrating circuit, and a volt meter controlled by said integrating circuit, and constituting said indicator.

6. Apparatus according to claim 2 wherein said wind sensing means comprises a vane mounted to oscillate between limits from a mean position set by a helmsman representing a required apparent wind direction, and said indicating means comprises a low drag potentiometer connected to move with said vane when oscillating between said limits, and a Wheatstone bridge circuit, including said potentiometer and having a moving coil indicating instrument in the bridge connection thereof for enabling said helmsman to steer the vessel to a course in which said instrument shows equal fluctuations of said vane on opposite sides of said set position.

7. Apparatus according to claim 2, a counting instrument comprising means for measuring and delivering signal impulses representing the speed of a vessel relative to water on which it is travelling, means for measuring and delivering signal impulses representing the speed of the apparent wind relative to said vessel, two counters respectively for counting said water speed signal impulses and said wind speed signal impulses, two digital display devices respectively for displaying counts by said two counters, a switch for starting the operation of said counters simultaneously, and a timer for automatically stopping said counters when said wind speed counter reaches a multiple of 10, whereby said water speed counter represents the quotient of said water speed divided by wind speed over a predetermined period of time.

8. Apparatus according to claim 7, in which said water speed measuring means comprises a trailing log having a rotor adapted to be drawn through the water by the vessel so that said rotor rotates at a speed corresponding to the water speed, a housing adapted to be mounted on the vessel to swivel about an axis set to enable said housing to take up a position relative to the vessel corresponding to the leeway angle of the vessel, a rotary shutter device in said housing, a line connecting said rotor and said shutter whereby said shutter is rotated by said rotor, a light emitting diode and a photo-cell mounted in said casing respectively on opposite sides of said shutter whereby said shutter periodically obturates light-passing from said diode to said cell at a rate corresponding to the water speed, and means for delivering electric pulses from said cell at a rate corresponding to said water speed.

9. Apparatus according to claim 7, in which said wind speed measuring means comprises a rotor mounted on a wind vane arranged to set the rotor to face the apparent wind, a shutter mounted to rotate with said rotor, a light emitting diode and a photo-cell mounted respectively on opposite sides of said shutter, whereby said shutter periodically obturates light passing from said diode to said cell at a rate corresponding to the apparent wind speed, and means for delivering pulses from said cell at a rate corresponding to said apparent wind speed.

10. For use in apparatus for establishing the mean direction of an unsteady air stream, a direction discriminator comprising a support, a wind vane mounted on said support to oscillate through a limited angle having a mean position on said support, mounting means for said support for setting said mean position of said wind vane in line with the air stream, means for integrating the oscillations of said wind vane within said limited angle and for producing signals representing the time-integrated value of the oscillations of said wind vane, and an indicator responsive to said signals enabling the setting of said mean position to be altered to a value in which said integrated value of the oscillations is substantially zero.

11. An apparatus as claimed in claim 10 wherein said integrating means comprises a reversible electric motor, electric contact means at the limits of said limited angle and electric contact means on said vane connected in electric circuit, whereby said motor rotates in one direction when said vane reaches one of said limits and in the opposite direction when said vane reaches the other of said limits, said indicator being geared to said motor.

12. An apparatus as claimed in claim 10 further comprising a photo-cell and a light emitting diode mounted for relative movement corresponding to the movement of said vane within said limited angle, obturating means interposed between said cell and said diode for passing light from said diode to said cell when said vane reaches one side of its limited angle of movement and for cutting off light from said cell when said vane reaches the other side of said limited angle, and circuit means comprising said cell and said integrating means and a volt meter controlled by said integrating means and constituting said indicator.

13. Apparatus as claimed in claim 10 wherein said indicator comprises a low drag potentiometer connected to move with said vane when said vane oscillates through said limited angle, and a Wheatstonebridge circuit, including said potentiometer and having a moving coil indicating instrument in the bridge connection thereof for enabling a helmsman to steer the vessel to a course in which said indicating instrument shows equal fluctuations of said vane on opposite sides of said mean position.

* * * * *